United States Patent Office

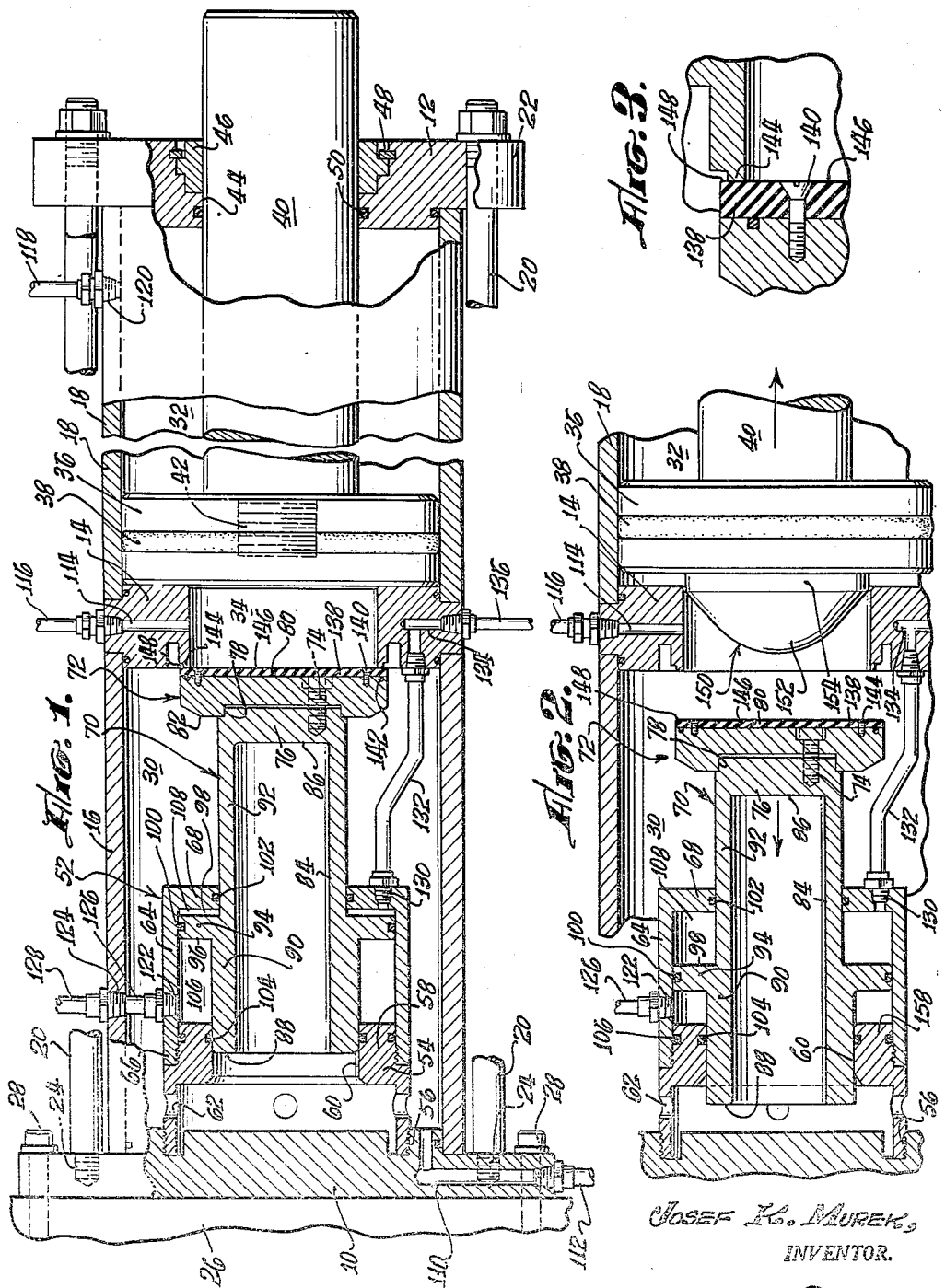

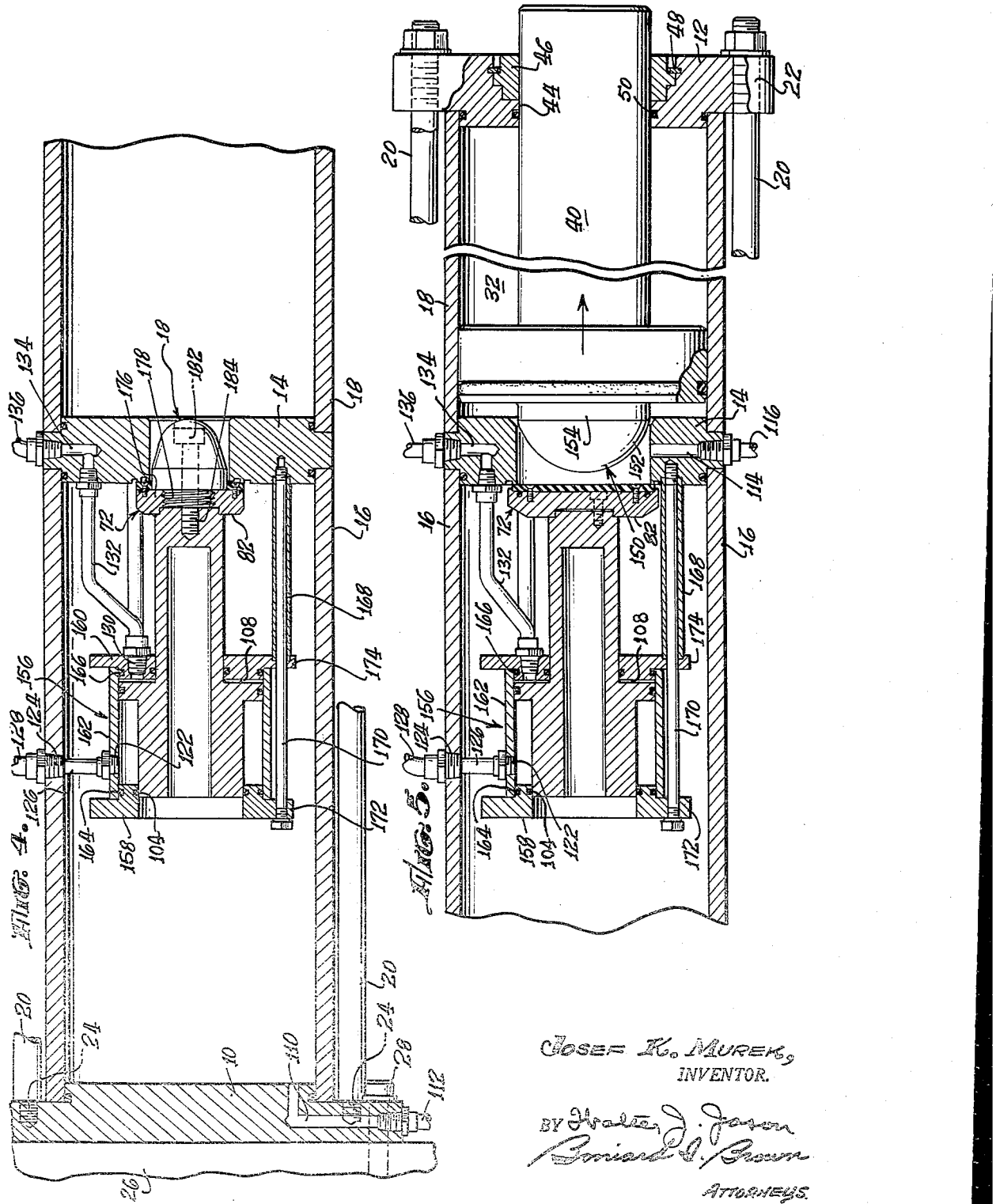

2,994,302
Patented Aug. 1, 1961

2,994,302
PRESSURE RELEASE SYSTEM WITH VALVE
PISTON HEAD
Josef K. Murek, Pomona, Calif., assignor to General
Dynamics Corporation, San Diego, Calif., a corporation of Delaware
Filed Aug. 4, 1960, Ser. No. 47,506
15 Claims. (Cl. 121—38)

The present invention relates generally to pressure release devices; more particularly, the invention relates to pressure release systems for the controlled rapid release of pressure.

The present invention represents improvements upon the inventions described and claimed in the copending application of Josef K. Murek, Serial No. 18,303, filed March 29, 1960 and in U.S. Patent No. 2,925,803 to Jack B. Ottestad, which relate to actuators or valves for producing high rate output thrust-time or pressure-time output patterns. In each of the devices of the copending applications, a valve piston confronts an orifice wall and is adapted to cooperate therewith to provide a pressure seal about the orifice. The actuating pressure acts on the valve piston to exert a set force urging the valve piston toward the wall to effect this seal. The actuating pressure also acts on a portion of the piston outside the pressure seal to oppose the set force. A triggering force is applied to the valve piston to overbalance the set force and suddenly eliminate the pressure seal, thereby suddenly releasing the actuating pressure upon the piston area within the pressure seal and impelling the valve piston from the orifice wall to effect high rate application of the actuating pressure to the actuator piston. In certain embodiments of the invention of the copending application, the triggering force is provided by the action of a triggering pressure on a transverse shoulder area of the valve piston. Such embodiments can function as true valves in releasing pressure directly to a lower pressure system or to atmosphere, because the orifice need not be closed by an actuating piston or other element to retain triggering pressure. In actuator embodiments triggering pressure may be applied to the piston area within the pressure seal about the orifice by introducing the pressure into the space defined by the orifice wall, the actuator piston and the valve piston. Output pressure-time or thrust-time patterns may be governed by utilizing a metering member either on the valve piston or on the actuator piston, the metering member cooperating with the orifice wall to regulate the release of pressure through the orifice.

The devices of the copending application of Josef K. Murek and of the above-mentioned patent to Jack B. Ottestad are characterized by certain shortcomings. Substantial orifice losses and losses in efficiency result from design considerations which limit the size of the orifice which may be utilized. Design considerations involving valve piston size and other considerations impose limits upon maximum orifice size. In order to provide the set force, special features and elements are utilized, which may involve relatively complex structure.

The present invention provides an improved pressure release system for the controlled high rate application or release of pressure. Although embodiments of the invention are somewhat similar to embodiments of the invention of the copending application of Josef K. Murek, the invention differs therefrom primarily in that a novel enlarged head is provided on the valve piston. The enlarged piston head confronts the orifice wall and is larger in size than the adjacent portion of the piston. The larger size of the piston head permits the use of larger orifices than may be utilized with the devices of the copending application. Orifice losses are reduced and efficiency is increased. Actuating pressure exerts a set force upon a back surface of the piston head. All of the required set force may be produced by the action of the actuating pressure on an enlarged piston head, thereby eliminating special features and elements otherwise required to produce set force.

It is therefore an object of the present invention to alleviate the aforementioned and other disadvantages of the prior art by providing a novel and improved pressure release system.

An object of the invention is the provision of an improved pressure release system which generally achieves the objects of the inventions of the copending application and of the copending patent hereinbefore mentioned.

It is an object of the invention to provide a novel pressure release system utilizing a novel valve piston head.

An object of this invention is to provide a pressure release system according to the foregoing object which provides increased efficiency.

It is an object of the present invention to provide a pressure release system according to the foregoing objects wherein a novel valve piston head cooperates with an actuating pressure to produce a set force, thereby eliminating the necessity for special features and elements for producing set force.

An object of this invention is the provision of a pressure release system capable of the controlled high rate release of pressure with low orifice losses.

It is an object of the invention to provide a high rate pressure release system for releasing pressure directly to a lower pressure system.

An object of the present invention is the provision of a pressure release system wherein an actuating pressure exerts a set force on a piston to urge the piston toward an orifice wall to effect a pressure seal about the orifice, and wherein a triggering force is applied to the piston to overbalance the set force and suddenly release the actuating pressure upon the piston area within the pressure seal to accelerate the piston from the orifice wall.

It is an object of the invention to provide a pressure release system according to the foregoing object wherein a novel enlarged valve piston head permits the use of a large orifice.

An object of the invention is the provision of a pressure release system according to the foregoing object wherein triggering is effected by the action of a triggering pressure on a transverse area of the valve piston.

Other objects and features of the present invention, as well as many advantages thereof, will become apparent to those skilled in the art from a consideration of the following description, the appended claims and the accompanying drawings, wherein:

FIGURE 1 is an elevational view, partially in section, of a preferred embodiment of the present invention in the form of an actuator;

FIGURE 2 is a partial sectional view showing a modified form of the actuator of FIGURE 1 in operation;

FIGURE 3 is a fragmentary sectional view showing details of a portion of the actuator of FIGURE 1;

FIGURE 4 is a partial elevational sectional view of another embodiment of the present invention; and FIGURE 5 is a partial sectional view of another embodiment of the present invention.

Referring to the drawings, and particularly to FIGURE 1, there is shown an actuator which represents a preferred embodiment of the present invention. The device includes a housing assembly formed by a base member 10, an end member 12, an orifice plate or wall 14, and cylindrical sections 16, 18 all of which are secured in clamped relation by tie-bolts 20. Each of the tie-bolts extends through an appropriate opening in a flange portion 22 of the end member 12 and is secured in a threaded opening 24 in the base member 10. The assembly is secured to a foundation or wall 26 by bolts 28 which extend through openings in the base member, as shown. The cylindrical housing is separated into an actuating pressure chamber 30 and a pressure chamber 32 by the orifice wall 14. An orifice 34 is provided in the orifice plate for purposes hereinafter described. Pressure sealing is provided for the chambers 30, 32 by resilient seal rings in appropriate grooves in the orifice wall 14, the base member 10, and in the end member 12, as shown.

An actuator piston 36 is slidable in chamber 30 and is adapted to seat against the orifice plate, as indicated in FIGURE 1. An annular sealing element 38 in a peripheral groove in the piston provides pressure sealing between cylindrical section 16 and the piston. A thrust column 40 is secured to the actuator piston by threaded engagement of its reduced end portion in an axial piston opening and extends through an axial opening 44 in the end member 12. The column is slidably received in a bearing 46 secured within an enlarged portion of the opening 44 by a locking ring 48. A resilient seal ring 50 in an appropriate groove within the opening provides pressure sealing about the thrust column.

A release system casing 52 is positioned in the actuating pressure chamber 30. A cap member 54 has a threaded end portion secured in a threaded recess 56 in the base member 10. A heavy annular portion 58 of the cap member defines a large axial opening 60, and a relatively thin adjacent portion defines a plurality of small circular openings 62 adjacent to the base member 10. A casing member 64 is mounted on cap member 54 by threaded engagement of its end portion 66 with a reduced portion of the cap member, and pressure sealing between these members is provided by a resilient seal ring in a groove in the cap member. An inwardly extending flange portion 68 of the casing member 64 provides an end wall of the release system casing.

A valve piston 70 is slidably mounted in the release casing 52. An enlarged piston head or head portion 72 is secured by bolts 74 to end portion 76 of the piston. A recess 78 adapts the head to fit about the piston end portion. The enlarged head 72 has a front area 80 confronting the orifice wall and has a back surface 82. A large axial opening 84 extends from inner surface 86 of the piston end portion 76 to an annular end surface 88 at the opposite end.

The valve piston comprises two axially extending reduced portions 90, 92 separated by an enlarged flange portion 94. The flange portion slidably engages casing member 64 and has oppositely facing transverse shoulder areas 96, 98. The reduced piston portion 92 slidably engages inwardly extending portion 68 of the casing member, and reduced portion 90 is slidable in opening 60 of cap member 54. Pressure sealing between the flange portion 94 and the casing member is provided by a seal ring 100. Similar sealing between piston portion 92 and the casing is effected by a seal ring 102. A seal 104 effects pressure sealing between piston portion 90 and the cap member.

The casing member 64, reduced piston portion 90, transverse shoulder area 96 and the cap member cooperate to define an expansible cushion pressure chamber 106. A triggering pressure chamber 108 is defined by the casing member 64, the transverse shoulder area 98 of the piston flange portion and the casing member 64.

The actuating pressure chamber 30 communicates with a source of actuating pressure (not shown) through a passage 110 in base plate 10 and a fluid coupling 112. A radial passage 114 in the orifice wall and a fluid coupling 116 interconnect the orifice 34 with a source of triggering pressure (not shown), which may be the source of actuating pressure. A fluid coupling 118 and an opening 120 in cylindrical section 18 provide means for introducing pressure from another source (not shown) into chamber 32. A port 122 in casing member 64, a port 124 in cylindrical section 16, and fluid couplings 126, 128 connect the cushion pressure chamber 106 with sources of pressure (not shown). A port 130 in the casing member, a coupling 132, a passage 134 in the orifice plate, and an external fluid coupling 136 interconnect the triggering pressure chamber 108 with a source of triggering pressure (not shown), which may be the source of actuating pressure.

The enlarged piston head 72 and the means for effecting pressure sealing between the head and the orifice wall are important features of the present invention. Sealing means in the form of a circular resilient sealing element or plate 138 is secured by screws 140 to the head front surface 80 confronting the orifice and orifice wall. An annular seal ring 142 provides pressure sealing between the surface and the sealing element. As shown in FIGURES 1 and 3, the resilient sealing element confronts a circular sealing rim 144 which is defined in the orifice wall 14 about the orifice 34. The sealing element 138 and the sealing rim are adapted for cooperation to provide or effect a circular pressure seal between the piston head 72 and the orifice wall when the piston is urged into engagement with the wall. As indicated in FIGURES 1 and 2, a large area 146 of the piston head front surface is within this pressure seal, and an annular portion or area 148 of the piston is disposed outside the pressure seal.

To prepare the actuator of FIGURE 1 for operation, a relatively low cushion pressure is introduced into cushion pressure chamber 106 through fluid couplings 126, 128 and port 122. A relatively high actuating pressure is established in the actuating pressure chamber 30 by means of the coupling 112 and the passage 110 in base plate 10.

The actuating pressure acts on the back surface 82 of piston head 72 to exert a set force on the valve piston. The actuating pressure also acts through the openings 62 in cap member 54 to exert additional set force on the valve piston by acting on the cross-sectional area of the piston defined within the seal ring 104, this area including the annular end surface 88 of piston 70 and inner surface 86 of end portion 76. The set force urges the valve piston against the orifice wall and compresses the resilient sealing element 138 against the sealing rim 144 to effect a positive pressure seal between the piston and the orifice wall 14 about the orifice 34. The actuating pressure also exerts a second force on the annular piston area 148 outside the pressure seal, this force opposing the set force on the piston. The sealing element 138 and the sealing rim effect a positive pressure seal even when the forces on the piston are nearly balanced.

The piston head 72 and the provision of set force thereby are important features of the present invention. It is to be understood that all the required set force may be provided by means of the head, and that set force need not be exerted on other portions of the valve piston.

To operate the actuator the set force is overbalanced by a triggering force. This is preferably done by introducing a triggering pressure into the triggering pressure chamber 108 through the external coupling 136, passage 134, coupling 132 and port 130. The triggering pressure may be the same as the actuating pressure or it may be a different pressure. This pressure acts on transverse shoulder area 98 of piston flange portion 54 and cooperates with the actuating pressure force on annular piston area 148 to overbalance the set force. The triggering force may also be applied by introducing a triggering pressure through coupling 116 and passage 114 to the actuator piston area 146 within the pressure seal at sealing rim 144. The force thus exerted cooperates with the force of the pressure on annular piston area 148 to overbalance the set force.

The overbalancing action of the triggering force unseats the valve piston and disengages the sealing element 138 from the sealing rim 144. With the pressure seal thus eliminated, the high actuating pressure is released substantially instantaneously upon the area 146 of the valve piston within the pressure seal. As indicated in FIGURE 2, the valve piston is suddenly impelled with great force from the wall and the actuating pressure is released substantially instantaneously through the orifice upon the entire area of actuator piston 36 defined within the peripheral sealing element 38. The actuator piston 36 is suddenly impelled with great force from the orifice wall to produce high level actuator output.

Deceleration of the valve piston is effected by compression in the cushion pressure chamber 106 and by the continuous force of the actuating pressure on the effective cross-sectional area of the valve piston 70 defined within the seal ring 104. Special structure is not necessarily required to effect valve piston deceleration.

From the foregoing, it will be understood that a piston head of relatively large diameter may be utilized to permit the use of a large orifice, thereby greatly reducing the orifice losses. Because of the high rate operation of the actuator, losses in energy and efficiency caused by orifice losses could be substantial. It will be further understood that the enlarged piston head may provide all required set force in cooperation with the actuating pressure, thereby eliminating the special features and elements otherwise required to produce a set force.

To prepare the actuator of FIGURE 1 for repeat operation, valve piston 70 and actuator piston 40 must be reseated against the orifice wall 14. The actuator piston may be reseated by introducing appropriate pressure into chamber 32 through the coupling 118 and the port 120, or by the exertion of mechanical force on the thrust column 40. The valve piston may preferably be reseated by relieving the pressure in triggering pressure chamber 108, whereupon the pressure in cushion pressure chamber 106 acts on the transverse shoulder area 96 of piston flange 94 to exert a reseating force. The valve piston 70 may also be reseated by introducing a reseating pressure into the cushion pressure chamber 106 through couplings 124, 128 and ports 122, 124 to exert reseating force on the shoulder area 96 of piston flange 94. Prefably, the pressure in chamber 30 is not relieved prior to reseating, and the reseating force must therefore be predetermined to effect reseating by cooperating with the pressure force on the back surface 82 of the piston head and the piston are defined within seal ring 104 to move the piston against the opposing force of the actuating pressure on the front area of the piston head. After reseating of the pistons is completed, the pressure in chamber 32 is preferably relieved and a predetermined cushion pressure is permitted to remain in the cushion pressure chamber 106.

Upon the reseating of the pistons, the trapping of pressure in the orifice space defined by the orifice wall 14, piston head 72 and the peripheral seal 38 on the actuator piston, is prevented by relieving pressure through the passage 114 and the coupling 116. Pressure trapped in this space would act upon the valve piston to oppose the set force exerted oppositely on the piston. A relatively low triggering force or pressure would then effect movement of the valve piston from the orifice wall 14. This would prevent effective triggering and would cause premature relatively slow movement of the valve piston, thus preventing effective operation of the actuator.

FIGURE 2 illustrates a modification of the actuator of FIGURE 1 which differs in that a metering member or pin 150 is provided on the actuator piston 36. The metering member has a contoured portion 152 which controls the output thrust-time pattern on the actuator piston and the thrust column, in the manner described in the copending application of Jack B. Ottestad, Serial No. 683,855, filed September 13, 1957, now Patent No. 2,949,096 issued on Aug. 16, 1960. An enlarged portion 154 of the metering member fits closely within the orifice and serves to prevent premature undesired thrust on the actuator piston and thrust column. The operation of the actuator is like that of the actuator of FIGURE 1 except that, upon the elimination of the pressure seal at the sealing rim 144 by the initial unseating movement of the valve piston, and after the release of pressure into the orifice, the actuating pressure is released upon the actuator piston area outside the metering member through a net flow area between the metering member and the orifice wall, as indicated in FIGURE 2. This net flow area is governed or varied by the metering member to produce a corresponding pressure drop across the flow area. The output pressure and the force on the actuator piston and on the thrust column therefore vary in accordance with this net flow area. Selected thrust-time patters may be produced by appropriate metering pins.

In FIGURE 4 is shown a modified embodiment of the present invention, which is adapted for use as a true valve and which differs from those hereinbefore described in that no actuator piston is utilized, a metering pin is provided on the valve piston, and the release system casing is secured to the orifice plate 14. A release system casing 156 includes first and second cap members 158, 160 and a cylinder element 160. Resilient seal rings 164, 166 provide pressure sealing between these elements. The release casing is maintained in spaced relation with the orifice plate 14 by tubular spacers 168. The cap members, the cylinder element and the spacers are secured in clamped relation by a plurality of tie-bolts 170, which extend through appropriate openings in flange portions 172, 174 of the respective cap members, and which are threadedly secured in openings in the orifice plate, as shown. A piston 70, like that of FIGURE 1, is slidable in the casing and is received in the opening 60. The cushion pressure chamber 106 and the triggering pressure chamber 108 are like those of FIGURE 1 and are similarly defined.

A modified piston head 176 has a threaded axial opening 178 in which a metering member or pin 180 is secured. The metering member and the head are secured to piston end portion 76 by a bolt 182, which extends through the pin and is threadedly received in an opening 184 in the head, the head of the bolt being received in an appropriate recess in the metering pin, as shown.

The operation of the valve system of FIGURE 4 corresponds to the operation of the actuator of FIGURE 1 up to the point where the triggering force or pressure eliminates the pressure seal and releases the actuating pressure upon the piston head surface confronting the orifice wall. Triggering is effected by introducing triggering pressure into triggering pressure chamber 108, in the manner described hereinbefore relative to the device of FIGURE 1. In the valve device of FIGURE 4 the appropriate areas and pressures are correlated so that the triggering force overbalances the set force exerted by the actuating pressure on the back surface 82 of the piston head and on the piston area defined within seal 104.

Upon the elimination of the pressure seal by the initial unseating of the valve piston, the actuating pressure is released through the orifice through a net flow area between the metering member 180 and the orifice wall. This net flow area is governed by the metering member to effect a pressure drop across the flow area which varies in accordance with the net effective flow area. The output pressure through the orifice therefore varies in accordance with the net flow area. Selected pressure-time output patterns may be effected by appropriately contoured metering pins.

It will be understood that the valve system of FIGURE 4 is capable of operating as a true valve in releasing pressure to a lower pressure system or to atmosphere. It will also be appreciated that the device may be utilized either with a metering pin to provide a predetermined output pressure-time pattern or it may be used without a metering pin to effect high rate pressure application or release.

The embodiment illustrated in FIGURE 5 utilizes the release system assembly of the device of FIGURE 4 and utilizes the actuator piston and metering pin shown in FIGURE 2. The operation of this embodiment is generally similar to that hereinbefore described relative to the embodiments shown in FIGURES 1 and 2.

From the foregoing description, those versed in the art will appreciate that the present invention achieves the objects and realizes the advantages mentioned hereinbefore and those mentioned in the copending applications herein identified.

Further, the novel enlarged piston head of the present invention permits the use of large orifices, thereby reducing orifice losses and increasing efficiency. The enlarged piston head cooperates with the actuating pressure to provide a set force. It may provide all the required set force, thus eliminating special features and complexities otherwise required for this purpose.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A pressure release system comprising housing means, a wall defining an orifice within the housing means, a valve piston having an enlarged head confronting the wall and adapted for cooperation therewith to provide a pressure seal about said orifice, said enlarged valve piston head having a back surface, means for applying a pressure to the valve piston head back surface to exert a set force urging the valve piston toward the wall to effect said pressure seal, and means for exerting a triggering force on the valve piston to overbalance the set force to eliminate the pressure seal and expose an increased area of the valve piston to said pressure, whereby the valve piston is accelerated from the wall to release the pressure through the orifice.

2. A pressure release system comprising housing means, a wall defining an orifice within the housing means, a valve piston having an enlarged head confronting the wall, a resilient sealing element disposed between the valve piston and the wall and adapted to provide a pressure seal between the piston head and the wall about said orifice, said enlarged valve piston head having a back surface, means for applying a pressure to the valve piston head back surface to exert a set force urging the valve piston toward the wall to effect said pressure seal, and means for exerting a triggering force on the valve piston to overbalance the set force to eliminate the pressure seal and expose an increased area of the valve piston to said pressure, whereby the valve piston is accelerated from the wall to release the pressure through the orifice.

3. A pressure release system comprising housing means, a wall defining an orifice within the housing means, a valve piston having an enlarged head confronting the wall and adapted for cooperation therewith to provide a pressure seal about said orifice, said valve piston head having a back surface, said valve piston head having a substantially transverse shoulder area spaced from the piston head, means for applying a pressure to the valve piston head back surface to exert a set force urging the valve piston toward the wall to effect said pressure seal, and means for applying a triggering pressure to said shoulder area to overbalance the set force to eliminate the pressure seal and expose an increased area of the valve piston to said pressure, whereby the valve piston is accelerated from the wall to release the pressure through the orifice.

4. A pressure release system comprising housing means, a wall defining an orifice within the housing means, a valve piston having an enlarged head confronting the wall and adapted for cooperation therewith to provide a pressure seal between the piston head and the wall about said orifice, said enlarged valve piston head having a back surface, means for applying a pressure to the valve piston head back surface to exert a set force urging the valve piston toward the wall to effect said pressure seal, means cooperating with a transverse area of the valve piston to define a triggering pressure chamber, and means for introducing a triggering pressure into the triggering pressure chamber to exert a triggering force on said valve piston transverse area to overbalance the set force to eliminate the pressure seal and expose an increased area of the valve piston to said pressure, whereby the valve piston is accelerated from the wall to release the pressure through the orifice.

5. An actuator comprising housing means, a wall defining an orifice within the housing means, an actuator piston positioned on a first side of the wall, a valve piston positioned on a second side of the wall, an enlarged head on the valve piston adapted for cooperation with the wall to provide a pressure seal therebetween about said orifice, said enlarged piston head having a back surface, means for establishing an actuating pressure to exert a set force on the valve piston head back surface to urge the valve piston toward the second side of the wall to establish said pressure seal, and means for applying a triggering force to the valve piston to overbalance the set force to eliminate the pressure seal and expose an increased area of the valve piston to said pressure, thereby accelerating the valve piston from the wall to release the actuating pressure through the orifice upon said actuator piston.

6. A pressure release system comprising housing means, a wall defining an orifice within the housing means, a valve piston having an enlarged head confronting the second side of the wall and adapted for cooperation therewith to provide a pressure seal between the piston head and the wall about said orifice, said valve piston head having a back surface and having substantially transverse first and second oppositely facing shoulder areas axially displaced from said back surface, means for applying an actuating pressure to the valve piston head back surface to exert a set force urging the valve piston toward the wall to effect said pressure seal, means for applying a triggering pressure to said first shoulder area to overbalance the set force to eliminate the pressure seal and expose an increased area of the valve piston to said actuating pressure, thereby accelerating the valve piston from the wall to release the actuating pressure through the orifice, and means cooperating with said second shoulder area of the valve piston to define a cushion chamber for applying pressure to the second shoulder area to exert decelerating force on the valve piston.

7. An actuator comprising housing means, a wall defining an orifice within the housing means, an actuator piston positioned on a first side of the wall, a valve piston having an enlarged head confronting a second side of the wall and adapted for cooperation therewith to provide a pressure seal between the piston head and the wall about said orifice, said valve piston head having a back surface and having substantially transverse first and second oppositely facing shoulder areas axially displaced from said back surface, means for applying an actuating pressure to the valve piston head back surface to exert set force urging the valve piston toward the wall, means for exerting additional set force urging the piston toward the wall, said set force effecting said pressure seal, and means for applying a triggering pressure to said first shoulder area to overbalance the set force to eliminate the pressure seal and expose an increased area of the valve piston to said actuating pressure, thereby accelerating the valve piston from the wall to release the actuating pressure through the orifice upon said actuator piston to produce useful output thrust.

8. A pressure release system comprising housing means, a wall defining an orifice within the housing means, a valve piston having an enlarged head confronting the wall, a resilient sealing element disposed between the valve piston and the wall and adapted to provide a pressure seal between the piston head and the wall about said orifice, said valve piston head having a back surface and having substantially transverse first and second oppositely facing shoulder areas axially displaced from said back surface, means for applying an actuating pressure to the valve piston head back surface to exert a set force urging the valve piston toward the wall to effect said pressure seal, means for applying a triggering pressure to said first shoulder area to overbalance the set force to eliminate the pressure seal and expose an increased area of the valve piston to said actuating pressure, thereby accelerating the valve piston from the wall to release the actuating pressure through the orifice, and means cooperating with said second shoulder area of the valve piston to define a cushion chamber for applying pressure to the second shoulder area to exert decelerating force on the valve piston.

9. A pressure release system comprising housing means, a wall defining an orifice between first and second pressure chambers within the housing means, a release system casing disposed in the second chamber, a valve piston slidable in the casing and extending therefrom to confront the orifice wall, said valve piston having an enlarged head portion adapted for cooperation with the wall to provide a pressure seal therebetween about said orifice, said valve piston head having a back surface, said valve piston having an enlarged flange portion separating first and second axially extending reduced portions, said enlarged flange portion slidably engaging the casing and having substantially transverse oppositely facing first and second shoulder areas, the casing and the enlarged piston portion cooperating with said first and second reduced piston portions respectively to define an expansible triggering pressure chamber and an expansible cushion pressure chamber, means for establishing an actuating pressure to exert a set force on said valve piston head back surface to urge the valve piston toward the wall to establish said pressure seal, means for establishing a triggering pressure in said triggering pressure chamber to act on said first transverse shoulder area to cooperate with said second force in overbalancing the set force to disengage said pressure seal and expose an increased area of the valve piston to the actuating pressure, thereby accelerating the valve piston from the wall to release the actuating pressure through the orifice, and means for establishing a cushion pressure in said cushion pressure chamber to act on said second shoulder area to exert decelerating force on the valve piston.

10. A pressure release system comprising housing means, a wall defining an orifice between first and second pressure chambers within the housing means, a release system casing disposed in the second chamber, a valve piston slidable in the casing and extending therefrom to confront the orifice wall, said valve piston having an enlarged head portion adapted for cooperation with the wall to provide a pressure seal therebetween about said orifice, said valve piston head having a back surface, said valve piston having an enlarged flange portion separating first and second axially extending reduced portions, said enlarged flange portion slidably engaging the casing and having substantially transverse oppositely facing first and second shoulder areas, the casing and the enlarged piston portion cooperating with said first and second reduced piston portions respectively to define an expansible triggering pressure chamber and an expansible cushion pressure chamber, means for establishing an actuating pressure to exert a set force on said valve piston head back surface to urge the valve piston toward the wall to establish said pressure seal, means for establishing a triggering pressure in said triggering pressure chamber to act on said first transverse shoulder area to cooperate with said second force in overbalancing the set force to disengage said pressure seal and expose an increased area of the valve piston to the actuating pressure, thereby accelerating the valve piston to the actuating pressure, thereby accelerating the valve piston from the wall to release the actuating pressure through the orifice, a contoured metering member on the valve piston for regulating flow through the orifice to produce a predetermined pressure-time output pattern, and means for establishing a cushion pressure in said cushion pressure chamber to act on said second shoulder area to exert decelerating force on the valve piston.

11. A pressure release system comprising housing means, a wall defining an orifice between first and second pressure chambers within the housing means, an actuator piston positioned in said first chamber, a release system casing disposed in the second chamber, a valve piston slidable in the casing and extending therefrom to confront the orifice wall, said valve piston having an enlarged head portion adapted for cooperation with the wall to provide a pressure seal therebetween about said orifice, said valve piston head having a back surface, said valve piston having an enlarged flange portion separating first and second axially extending reduced portions, said enlarged flange portion slidably engaging the casing and having substantially transverse oppositely facing first and second shoulder areas, the casing and the enlarged piston portion cooperating with said first and second reduced piston portions respectively to define an expansible triggering pressure chamber and an expansible cushion pressure chamber, means for establishing an actuating pressure to exert a set force on said valve piston head back surface to urge the valve piston toward the wall to establish said pressure seal, means for establishing a triggering pressure in said triggering pressure chamber to act on said first transverse shoulder area to cooperate with said second force in overbalancing the set force to disengage said pressure seal and expose an increased area of the valve piston to the actuating pressure, thereby accelerating the valve piston from the wall to release the actuating pressure through the orifice upon the actuator piston to produce output thrust, and means for establishing a cushion pressure in said cushion pressure chamber to act on said second shoulder area to exert decelerating force on the valve piston.

12. A pressure release system comprising housing means, a wall defining an orifice between first and second pressure chambers within the housing means, an actuator piston positioned in said first chamber, a release system casing disposed in the second chamber, a valve piston slidable in the casing and extending therefrom to confront the orifice wall, said valve piston having an enlarged head portion adapted for cooperation with the wall to provide a pressure seal therebetween about said orifice, said valve piston head having a back surface, said valve piston having an enlarged flange portion separating first and second axially extending reduced portions, said enlarged flange portion slidably engaging the casing and having substantially transverse oppositely facing first and second shoulder areas, the casing and the enlarged piston portion cooperating with said first and second reduced piston portions respectively to define an expansible triggering pressure chamber and an expansible cushion pressure chamber, means for establishing an actuating pressure to exert a set force on said valve piston head back surface to urge the valve piston toward the wall to establish said pressure seal, means for establishing a triggering pressure in said triggering pressure chamber to act on said first transverse shoulder area to cooperate with said second force in overbalancing the set force to disengage said pressure seal and expose an increased area of the valve piston to the actuating pressure, thereby accelerating the valve piston from the wall to release the actuating pressure through the orifice upon the actuator piston, and a contoured metering member on the actuator piston for regulating flow through the orifice to produce a predetermined thrust-time pattern.

13. A pressure release system comprising housing means, a wall defining an orifice within the housing means, a release system casing mounted on a base member opposite the orifice wall, a valve piston slidable in said casing and extending therefrom to confront the orifice wall, the valve piston having an enlarged head portion adapted for cooperation with the wall to provide a pressure seal therebetween about said orifice, said valve piston head portion having a back surface, means for establishing an actuating pressure to exert a set force on the valve piston head back surface to urge the valve piston toward the wall to establish said pressure seal, means for admitting the actuating pressure into the release system casing to exert additional set force on the valve piston urging the piston toward the wall, and means for applying a triggering force to the valve piston to overbalance the set force to eliminate the pressure seal and expose an increased area of the valve piston to said pressure, whereby the valve piston is accelerated from the wall to release the pressure through the orifice.

14. A pressure release system comprising housing means, a wall defining an orifice within the housing means, a release system casing secured to and spaced from the orifice wall, a valve piston slidable in said casing and extending therefrom to confront the orifice wall, the valve piston having an enlarged head portion adapted for cooperation with the wall to provide a pressure seal therebetween about said orifice, said valve piston head portion having a back surface, means for establishing an actuating pressure to exert a set force on the valve piston head back surface to urge the valve piston toward the wall to establish said pressure seal, and means for applying a triggering force to the valve piston to overbalance the set force to eliminate the pressure seal and expose an increased area of the valve piston to said pressure, whereby the valve piston is accelerated from the wall to release the pressure through the orifice.

15. A pressure release system comprising housing means, a wall defining an orifice within the housing means, a release system casing secured to and spaced from the orifice wall, a valve piston slidable in said casing and extending therefrom to confront the orifice wall, the valve piston having an enlarged head portion adapted for cooperation with the wall to provide a pressure seal therebetween about said orifice, said valve piston head portion having a back surface, means for establishing an actuating pressure to exert a set force on the valve piston head back surface to urge the valve piston toward the wall to establish said pressure seal, means for admitting the actuating pressure into the casing to exert additional set force on the valve piston urging the piston toward the wall, and means for applying a triggering force to the valve piston to overbalance the set force to eliminate the pressure seal and expose an increased area of the valve piston to said pressure, whereby the valve piston is accelerated from the wall to release the pressure through the orifice.

References Cited in the file of this patent

UNITED STATES PATENTS 2,925,803     Ottestad _____ Feb. 23, 1960